(12) United States Patent
Sanchez

(10) Patent No.: US 6,971,122 B2
(45) Date of Patent: Dec. 6, 2005

(54) SWEAT DIVERSION BAND

(76) Inventor: Paul E. Sanchez, 1201 Valerio La., Las Vegas, NV (US) 89134

( * ) Notice: Subject to any disclaimer, the term of this patent is extended or adjusted under 35 U.S.C. 154(b) by 502 days.

(21) Appl. No.: 10/118,629

(22) Filed: Apr. 8, 2002

(65) Prior Publication Data

US 2003/0041365 A1    Mar. 6, 2003

Related U.S. Application Data

(60) Provisional application No. 60/315,169, filed on Aug. 28, 2001.

(51) Int. Cl.$^7$ ............................................... A42B 1/00
(52) U.S. Cl. ........................................ 2/181.6; 2/174
(58) Field of Search ............................ 2/181, 209.13, 2/DIG. 11, 181.6; 604/9, 312

(56) References Cited

U.S. PATENT DOCUMENTS

| | | | | |
|---|---|---|---|---|
| 1,750,937 A * | 3/1930 | Morgan | ........................... | 4/521 |
| 4,394,782 A | 7/1983 | Wasson | ........................... | 2/181 |
| 4,626,247 A * | 12/1986 | Frankel | ........................ | 604/312 |
| 4,638,512 A | 1/1987 | Frankel | ........................... | 2/171 |
| 4,833,734 A | 5/1989 | Der Estephanian | ............. | 2/171 |
| 4,856,116 A | 8/1989 | Sullivan | ........................... | 2/181 |
| 5,092,667 A * | 3/1992 | Bagley | ........................ | 351/156 |
| 5,146,630 A | 9/1992 | Richard | ........................... | 2/181 |
| 5,175,887 A | 1/1993 | Kim | ................................. | 2/174 |
| 5,423,091 A | 6/1995 | Lange | ............................ | 2/181 |
| 5,692,380 A | 12/1997 | Cox et al. | ....................... | 62/56 |
| 5,740,556 A * | 4/1998 | Brown | ........................... | 2/181 |
| 5,745,921 A | 5/1998 | Mitchell et al. | ............... | 2/181 |
| 5,781,932 A | 7/1998 | Brown | ........................... | 2/181 |
| 5,826,277 A | 10/1998 | McConville | .................... | 2/171 |
| 5,926,848 A | 7/1999 | Bartholomae | .................. | 2/171 |
| 6,108,818 A | 8/2000 | Eisenberg | .................... | 2/181.2 |
| 6,115,843 A * | 9/2000 | Travalgia | ........................ | 2/171 |
| 6,138,280 A | 10/2000 | Bae | ................................. | 2/181 |
| 6,189,151 B1 | 2/2001 | Curtis | ............................. | 2/171 |
| 6,205,590 B1 | 3/2001 | Gorman | .......................... | 2/181 |
| 6,353,936 B2 * | 3/2002 | Flatt | ............................... | 2/181 |
| 2001/0047536 A1 | 12/2001 | Flatt | ............................... | 2/181 |

* cited by examiner

*Primary Examiner*—Katherine M Moran

(57) ABSTRACT

Worn flat on the forehead as a headband, the Sweat Diversion Band diverts perspiration from the upper forehead and away from the eyes using laminated neoprene. Laminated neoprene is a commercially available, low cost, off-the-shelf material. Laminated neoprene possesses the required capillary and hydraulic properties to absorb liquid perspiration on the forehead, and laterally divert the liquid perspiration to cylindrical outflow lengths bending downward behind the ears. The ends of the headband are folded extensions of the laminated neoprene and provide an optional means to secure the headband to the head. The top of the Sweat Diversion Band features an angular cut through the entire cross-section of laminated neoprene. Sloping toward the head, this feature facilitates absorption of the liquid into the inner wicking fabric worn against the skin. Liquid perspiration is then transported and eliminated below the ears.

5 Claims, 3 Drawing Sheets

SWEAT DIVERSION BAND

CROSS-REFERENCE TO RELATED APPLICATIONS

Applicant hereby claims priority of U.S. Provisional Patent Application 60/315,169, filed Aug. 28, 2001, titled "Sweat Diversion Band".

FEDERALLY SPONSORED RESEARCH

Not Applicable

SEQUENCE LISTING

Not Applicable

BACKGROUND

1. Field of Invention

The Sweat Diversion Band is a headband that diverts sweat away from the face and eyes during fitness, sports, or other activities that cause profuse sweating from the upper portion of the head, including outdoor activities in hot weather. The U.S. Census Bureau refers to the technical field as sports-related apparel. Combining wicking properties and hydraulic gradient, headband eliminates sweat through outflow points located behind the ears using a single, commercially available, low cost, off-the-shelf laminated material composed of an inner impermeable layer encapsulated by two permeable fabric layers.

2. Description of Prior Art

Profuse sweating results from vigorous aerobic exercise, high temperature or humidity, as well as the genetic disposition of the individual to sweat. Almost thirty sweatband or headband patents over the past twenty years have been issued related to sweat management on the forehead. Most of these patents articulate a similar purpose: to keep sweat away from the face and eyes during strenuous activities. No device can promise complete elimination of facial perspiration, as some sweat emanates from below the headband/sweatband. However, each device claims unique features to minimize annoyance of facial perspiration.

The prior art involving sweat or fluid management on the forehead generally falls into two general categories: absorption or diversion. The majority are absorption-related and are traditional headbands, each asserting improvements in the design or materials used. Various unique features have been emphasized, such as tubular shape, detachable accessories, disposability, or special absorbent granular materials. Such sweatbands are either single or multi-layered and are composed exclusively from permeable fabrics. Asserted improvements include enhanced absorbency, wicking of moisture outward from internal to external layers, evaporative cooling, and fashion appeal.

Practical width and thickness restricts the performance of primarily absorbent cotton or cotton synthetic blend fabrics. Such fabrics tend to become hot and heavy when subjected to profuse sweating, or they can become over-saturated and drip. In cases where alternative functionality is emphasized, a number of devices describe wicking and evaporation to keep sweat away from the eyes. These designs wick sweat outward from inner layers to outer layers where the sweat can evaporate. Multi-layered and/or light-weight synthetic fabric devices relying solely on absorbency and/or wicking are deficient in that profuse sweating can exceed the saturation capacity of the device and result in dripping on the forehead. They are not designed to remove voluminous liquid sweat using liquid discharge and do not use impermeable materials in their design. The Sweat Diversion Band overcomes such deficiencies described above by combining absorption and diversion to ensure continuous elimination of fluid perspiration. See representative U.S. Pat. Nos. 6,205,590, 5,926,848, 5,745,921, 5,692,380, 5,423,091, and 5,146,630.

Two issued patents representative of sweat diversion are described in U.S. Pat. Nos. 5,781,932 and 4,638,512, issued Jul. 21, 1998 and Jan. 27, 1987, respectively. These patents achieve diversion through multi-component apparatus that emphasize macroscopic movement of liquid sweat within impermeable troughs or within impermeable cylinders worn across the forehead. U.S. Pat. No. 5,781,932 and related patents describe the cylinder as composed of an impermeable material (i.e. rubber) worn against the skin. Physical apertures allow intake of sweat into a permeable core. The permeable tubular core transfers liquid moisture to a discharge tube located on the back below the shoulders.

U.S. Pat. No. 4,638,512 and related patents describe a nonabsorbent trough worn against the skin to collect fluids. Sweat is mechanically collected in the trough and diverted away from the face. Yet another device, Patent Application No. 20010047536 describes a trough similar to U.S. Pat. No. 4,638,512. Performing essentially the same function, Patent Application No. 20010047536 also removes sweat using a gutter spanning the brow, or forehead area. Both eliminate sweat from the headband above the ear, albeit at different locations. Both are essentially traditional head bands wrapped around the back of the neck.

All of the above diversion devices employ pre-molded features and needlessly use overly complex designs that would require additional manufacturing steps not required in the Sweat Diversion Band. Likewise, the designs do not lend themselves to fashion appeal and have not been observed in the market as being successful. The Sweat Diversion Band uses an existing commercially available, low cost, off-the-shelf laminate material that accomplishes diversion in a simpler manner and which has already demonstrated fashion appeal on the market.

SUMMARY OF THE INVENTION

The Sweat Diversion Band is a substantially flat, thin, rectangular, elongate member worn laterally across the forehead and extending, as a single unit, downward behind the ears. In prototype construction, the outlet length behind the ears is folded and trimmed forming a generally flattened elongated cylinder in cross-section. A separate attachment can be used to adjust the tautness of the headband. Alternatively, water tension can hold the forehead member in place without a rearhead attachment.

The Sweat Diversion Band employs fluid flux in the longitudinal direction to eliminate sweat to outflow points behind and below the ears. Absorbency is not the primary feature, so the saturation threshold of the material does not restrict performance. A provisional patent filed Aug. 28, 2001 refers to a variety of materials that display optimum thermal and capillary characteristics, identifying materials including, but not limited to synthetic elastomers and/or fibers, cotton/synthetic composite materials, or combinations thereof. Such materials or material composites may display hydrophilic (i.e., absorbent) or hydrophobic properties. Laminated neoprene continues to be identified as the candidate material based on functional tests, cost considerations and market appeal.

Laminated neoprene is a commercially available, low cost, off-the-shelf laminate material that comes in variety of colors and thicknesses. Laminated neoprene is lightweight and is mass-produced at low cost for a variety of applications, including sports apparel. Laminated neoprene is comprised of a thin impermeable neoprene rubber sheet encased in two thin elastic permeable fabric layers. Neoprene (polychloroprene) is a synthetic rubber best known as the inner core of laminated neoprene used in wet suit construction. In the preferred embodiment, the neoprene composition is a low-cost 30% CR and 70% SBR neoprene, commonly used in sports-related products. Specialized breathable neoprene, marketed as Airprene®, could also be used. Common fabrics with acceptable wicking properties laminated to the neoprene include nylon and Lycra® spandex. Specialized wicking fabrics could also be used such as CoolMax®.

The Sweat Diversion Band employs a layer of inner wicking material (inner synthetic fabric laminate) juxtaposed against the forehead. The primary function of the inner layer is to intake perspiration using the capillary properties of the fabric and to transfer the sweat down gradient within the fabric to outflow points. The neoprene core is an impermeable boundary that regulates wicking of sweat into the inner fabric layer and facilitates diversion as thin water films external to the laminated material. In the preferred embodiment, an angular cut exists through the laminate cross-section at the top of the headband and slopes toward the forehead. This feature facilitates absorption of sweat into the inner fabric and wicking into the outer fabric layer, where sweat evaporates or is transported laterally. This latter effect is best realized using an embodiment where the outer fabric is Lycra® spandex and the orientation of the fabric weave is vertical.

The overall design provides a method for sweat to be drawn by capillary forces (i.e., wicking—molecular-driven suction), pressure gradient, and/or gravity from the forehead to points of negative pressure at the ends of the outflow tubes behind ears. In a steady state flux, when sweating is profuse and continuous, the more profuse the sweating, the more the sweat is drawn through the material and removed.

Note that although neoprene is known for thermal insulation, at the width and thickness proposed, the material actually remains cooler than the forehead. Sweat removed from the forehead also carries away heat from the forehead, which acts to counter effects of thermal insulation.

Having briefly described the Sweat Diversion Band, the primary object of the present invention is to eliminate or minimize the amount of sweat away reaching the face and eyes. The desired result is enhanced performance in sports, fitness and other activities and/or decreased annoyance from sweat on the face and in the eyes caused by strenuous activities or exertion in hot/humid environments. Diversion of the majority of perspiration will reduce annoyance, distraction, and irritation, allowing the user to focus on the activity being performed, rather than on frequent facial wiping.

A further object of the Sweat Diversion Band is to provide a thin, lightweight alternative to traditional absorbent bands, which have limitations, described above. The Sweat Diversion Band is not restricted by the saturation threshold associated with absorbent sweatbands when subjected to profuse sweating, and does become hot and heavy. Another object is to provide a simpler, low technology and low cost alternative to other diversion-related devices previously described. A further object of the Sweat Diversion Band is to leverage existing industry standard fashion enhancements associated with laminated neoprene products to improve the aesthetic appearance of the prior art.

BRIEF DESCRIPTION OF THE DRAWINGS

Laminated materials do not usually require drawings, unless the drawings are helpful in clarifying the novel design, operation or construction of the invention. Consequently, four drawings are presented. These drawings and their description represent a general prototype that can be modified by leveraging different manufacturing processes or approaches consistent with the Claims. Preferred and alternative embodiments are discussed within the context of these figures.

DRAWING FIGURES

Figure 1:
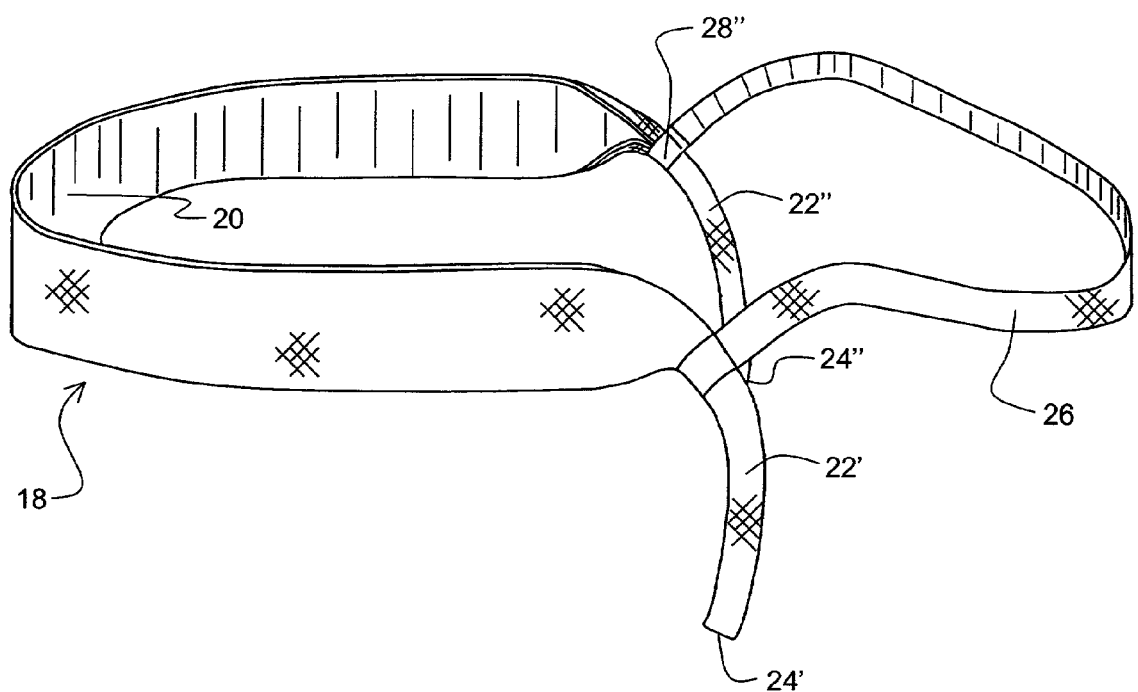
Figure 2:
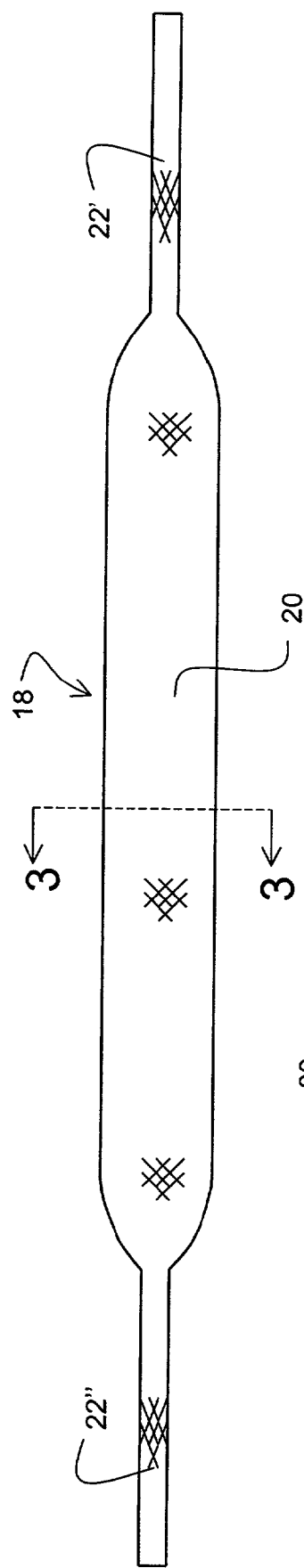
Figure 3:
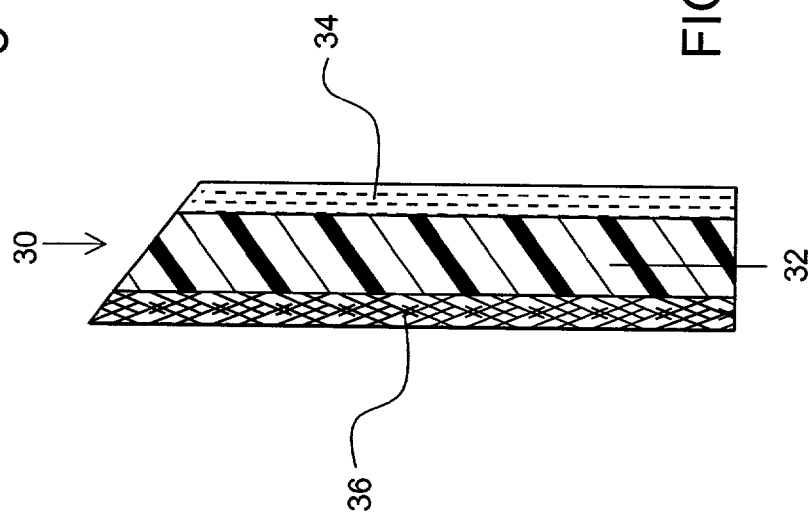
Figure 4:
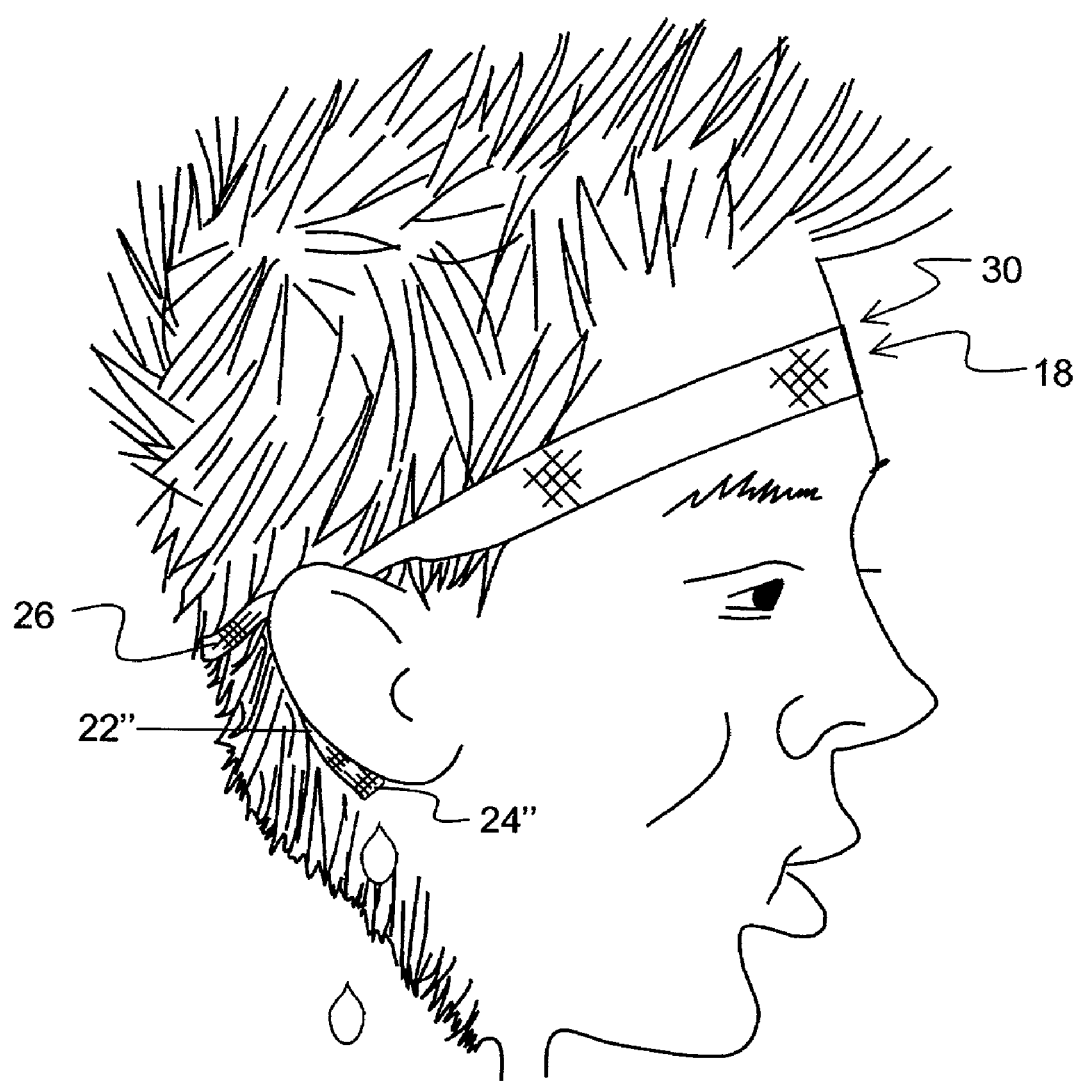

FIG. 1 is a rear left elevational perspective view of the of the preferred embodiment of the headband member, including the optional rear attachment securing member, FIG. 2 is the plan frontal view of the headband member, including the folded length at each end forming the ends of the headband member FIG. 3 is a large-scale cross-section through the medial portion of the headband member generally along dashed line 3—3 of FIG. 2 showing angular feature of Claim 1 at the top medial portion, FIG. 4 is an orthogonal view diagrammatically illustrating placement of the sweat diversion band on the forehead and behind the ears, including operation of the outflow points.

REFERENCE NUMERALS IN DRAWINGS

18 Preferred embodiment of the complete Sweat Diversion Band
20 Flat, rectangular medial portion of headband member
22' Left extension of headband member (i.e. end portion of headband member)
22" Right extension of headband member (i.e. end portion of headband member)
24' Outflow point of left end portion of headband member
24" Outflow point of right end portion of headband member
26 Rear head attachment member
28' Slidably attached loops on rear head attachment—left
28" Slidably attached loops on rear head attachment—right
30 Cross-section showing angled cut through the medial portion of headband member
32 Thin, impermeable neoprene core layer
34 Nylon mesh synthetic fabric laminate
36 Lycra® spandex mesh synthetic fabric laminate
38 Upper surface of the headband

DETAILED DESCRIPTION OF PREFERRED AND ALTERNATIVE EMBODIMENTS

FIG. 1 shows the preferred embodiment of the sweat diversion band, generally indicated by the numeral 18 in the drawings. As shown, the headband member primarily consists of a flat, rectangular medial portion, shown as numeral 20, with narrower end portions forming left and right extensions of the headband member, shown as numerals 22' and 22". These are referred to as end portions of said headband member and possess at their terminus outflow points, shown as numerals 24' and 24" in the drawings. End portions of the head band member 22' and 22" are generally described as substantially narrowed to form a pliable curved shape intended to fit behind the ears.

Slidably attached to the headband member is //a// an optional rear head attachment member, generally shown as numeral 26 in FIG. 1 of the drawings. The rear head attachment member is a thin band of laminated neoprene approximately 20 cm (11.5 inches) in length. The ends are folded over at each end to form a loop approximately 8.0 mm (0.30 inches) in diameter and sewn in place. The loops slidably fit over the end portions of the headband members 22' and 22". The loops, shown as numerals 28' and 28", are shown slidably attached at a representative location on the end portions of the head member. Slideable adjustment of the rear head attachment 26 will accommodate head diameters ranging from about 55 cm (21.5 inches) to 61 cm (24 inches). The rear head attachment is optional because the headband member can be secured relying only on the suction created between the headband and forehead and the securing means afforded by the extensions 22' and 22" looped behind the ears.

FIG. 1 shows the outlet length behind the ears 22' and 22" to be folded extensions of the headband member, which is sewn and trimmed to a predetermined length near the location of the loops 28' and 28". One technical requirement for a one-size fits-all is the folded length behind the ears. Over compensation for the length behind the ears increases performance, so longer discharge lengths are defined in the preferred embodiment. In an alternative embodiment, the lengths behind the ears could be less. In a less preferred embodiment, the headband could warp wrap around the head without outflow lengths, much as a traditional headband. However, if wrapped only around the head, discharge would not be as efficient and would restrict the continuous flow and elimination of fluid perspiration.

The relative dimensions of the headband member 18 are illustrated in FIG. 2. In the preferred embodiment 18, the width of the medial forehead member 20 is nominally about 25 mm (1.0 inches). The length of the medial forehead member 20 is nominally about 27 cm (10.5 inches) measured between the narrower end portions of the headband member 22' and 22". The outlet lengths behind the ears, referred to as the end portions of the headband member 22' and 22", nominally range between 8.0 to 9.5 mm (0.35 to 0.37 inches), depending on ear size and aesthetic considerations. As described, the narrow end portions of the headband member 22' and 22" are folded, sewn and trimmed, forming a generally flattened elongated cylinder in cross-section measuring about 10 mm wide (0.40 inches). Mass production of the preferred plan dimensions can be easily achieved using industry standard templates. Industry standard industrial sewing techniques are required for mass production of the end portions of the headband member 22' and 22".

The laminated neoprene used in the construction of the sweat diversion band 18 is composed of three layers, as shown in FIG. 3. FIG. 3 is a diagrammatic cross-section showing the relative dimensions of the laminated materials, emphasizing the angular cut through all the laminated layers, shown as numeral 30. This angular cut extends along the length of the medial portion of the headband member 20. FIG. 3 shows the flat neoprene sheet, shown as numeral 32, that forms the impermeable core of the laminated material. The neoprene rubber used in laminated neoprene is commercially produced in a variety of grades. Neoprene grade 30% CR and 70% SBR is the least expensive grade already used in sports and other commercial products. In the preferred embodiment, neoprene grade 30% CR and 70% SBR is identified as the preferred composition based on observed performance.

Two common synthetic fabric laminates with acceptable wicking properties encase the neoprene core layer 32. Nylon and Lycra® spandex fabric laminates are shown as the preferred wicking fabrics as numerals 34 and 36 in FIG. 3, respectively. Either synthetic fabric laminate 34 or 36 can act as the inner layer placed against the skin to wick and absorb liquid perspiration into the member. The selected materials 34 and 36 also possess the necessary physical properties to facilitate diversion of sweat. Although laminated neoprene is generally hydrophobic, liquid introduced onto the upper surface of the headband member 30 is readily wicked and absorbed into the inner synthetic fabric laminate layer. As shown in FIG. 3, the nylon mesh 32 is the inner layer and the Lycra® spandex mesh 34 is the outer member. Once introduced, either inner fabric laminate possesses the necessary capillary and hydraulic properties to eliminate fluids down gradient through the left and right extensions of the headband member shown as 22' and 22" in FIG. 2. Specialized breathable neoprene, marketed as Airprene®, could be used as the inner core 32. Specialized wicking fabric, such as CoolMax®, could be used for the fabric laminates 34 or 36. In the preferred embodiment, the outer fabric laminate is Lycra® spandex 36, with the fabric grain oriented vertically to facilitate wicking into the outer layer, if necessary, where sweat is wicked down gradient or evaporated.

The laminated neoprene material shown in cross-section in FIG. 3 can range from 1.5 to 2.0 mm (0.06 to 0.08 inches) in total thickness. In the commercially available stock used to demonstrate functionality of the preferred embodiment 18, the neoprene core 32 is about 1.0 mm (0.04 inches) in thickness. In the preferred embodiment, the nylon mesh 34 and Lycra® spandex mesh 36 laminate are about 0.25 mm (0.010 inches) each in thickness. The fabric layer thicknesses are variable and provided only as examples. Different layer thicknesses are commercially available and may also display suitable characteristics described herein, especially considering the objective to minimize the neoprene rubber thickness.

For mass production, industry standard templates or angled fabric rotary cutters would be required to create the angular cut on the upper portion of the headband member 30. Cutting the laminated material at an angles ranging from 30 to 45 degrees, sloping toward the head, would leverage the regulating effect the impermeable core 32 has on the intake of liquid perspiration into the inner fabric layer, be it the nylon mesh 34 or Lycra® spandex mesh 36.

As shown in FIG. 4, the headband member 18 is worn in the customary manner on the forehead, the inner fabric layer placed flat against the skin of the upper forehead. The porous, woven, hydrophilic fabric laminate juxtaposed against the skin absorbs fluid perspiration. The inner fabric layer is primarily responsible for diverting and conducting the sweat laterally and then downward to the outflow point 24" located at the terminus of the narrower end portions of the headband 22" fitted behind the ear. External flow in thin liquid films also contributes to diversion of fluid perspiration, including incidental flow on the top of the headband 30.

Facing the forehead, the angular at cut at the top of the band 30 is intended as a means to regulate wicking absorption of liquid sweat into the inner fabric layer, especially prior to continuous saturation of the headband. Refer to FIG. 3 to see the angled cut enlarged for detail. Once saturated, fluid perspiration is continually discharged to the outflow point 24". Using the materials described above, industry standard fashion enhancements associated with laminated neoprene products can be easily incorporated to improve the aesthetic appearance of the prior art. Lycra® spandex comes in a variety of colors and allows for printed designs and logos. The Sweat Diversion Band is also thin, and should fit comfortably under most products on the market with different functionality, such as skullcaps, baseball caps, helmets, decorative headbands etc.

The sweat diversion band offers a stylistic and functional alternative to absorption and diversion-related prior art. The Sweat Diversion Band overcomes the prior art deficiencies and leverages an existing mass-produced marketed material. Laminated neoprene is primarily associated with the thermal insulation properties preferred in wet suit construction. The use of a material associated with thermal insulation teaches away from use of such material in a headband, which preferably should allow escape of heat from the head. To one skilled the art, such a use would not be obvious. The Sweat Diversion Band overcomes such a limitation by using a very thin layer and limited coverage of the forehead area. The continuous removal of sweat also acts to remove latent heat from the forehead area.

Whereas many of the numerous patents discussed herein, in particular diversion-related devices, have not met commercial success, the Sweat Diversion Band is new in that the material is already mass-produced as sheets in the proper dimensions. Furthermore, the fashion appeal of this off-the-shelf material has already been demonstrated on the market, such as in the use of eyeglass holders, cup holders, and skin suits of which some are adorned with imprinted art and logos. Although the commercial success of the Sweat Diversion Band cannot be guaranteed, low production costs of a mass-produced material and proven commercial appeal suggest an improved probability for success.

The Sweat Diversion Band is also new in that the diversion function occurs primarily within a permeable fabric laminate, and along the laminate and neoprene boundary, using the unique characteristics of the existing composite laminated construction. The combined use of wicking absorbency and hydraulic properties of the synthetic material obviates the need for a molded physical gutter or trough. Additionally, the ability to secure the headband using only the outflow lengths behind the ears is novel, relying in part on the suction created by water tension created between the headband and forehead.

Although the description above contains many specifications, these should not be construed as limiting the scope of the invention but merely as providing illustrations of some of the presently preferred and alternative embodiments of this invention. Thus, the scope of the invention should be determined by the appended claims and their legal equivalents, rather than by the examples of the preferred and alternative embodiments discussed above.

What is claimed is:

1. A headband comprising a laminated neoprene band having end portions, said band providing means for transport of sweat from upper forehead of a wearer to outflow points located at said ends, said band comprising two thin synthetic fabrics laminated to each side of a flat, thin neoprene rubber core;
   a. wherein the band includes a substantially flat, rectangular, elongate medial portion extending laterally across the forehead,
   b. wherein the top of said medial portion is angled toward the forehead, providing means for regulating intake of perspiration into said synthetic fabric portion in contact with the forehead,
   c. wherein a rear head attachment member constructed of laminated neoprene is slidably and removably attached to said band, and optionally provides means for securing the headband to the head,
   d. wherein said headband could be optionally secured to the head by extending said end portions behind the wearer's ears.

2. A headband according to claim 1, wherein said headband and said end portions are means for diverting and conducting sweat laterally and then downward, substantially internal and external to the headband member.

3. A headband according to claim 1, wherein said end portions are an extension of the medical portion and bend downward at the ear at a predetermined location to provide means for outflow of fluid perspiration.

4. A headband according to claim 1, wherein said end portions are substantially narrowed and folded to fit under and around back of ears.

5. A headband according to claim 1, wherein the headband member has a thickness of substantially 2.0 on the order of millimeters.

* * * * *